(12) United States Patent
Haswell et al.

(10) Patent No.: US 8,366,547 B2
(45) Date of Patent: Feb. 5, 2013

(54) RACING CAR WHEEL AND CONTROLS FOR USE IN A MULTIMEDIA INTERACTIVE ENVIRONMENT

(75) Inventors: Jonathan Haswell, San Francisco, CA (US); Jieming Li, Fremont, CA (US)

(73) Assignee: Ignite Game Technologies, Inc., San Francisco, CA (US)

( * ) Notice: Subject to any disclaimer, the term of this patent is extended or adjusted under 35 U.S.C. 154(b) by 143 days.

(21) Appl. No.: 12/961,341

(22) Filed: Dec. 6, 2010

(65) Prior Publication Data
US 2012/0142417 A1    Jun. 7, 2012

(51) Int. Cl.
*A63F 13/02* (2006.01)

(52) U.S. Cl. ............. 463/37; 463/6; 463/7; 463/36; 463/38; 463/39

(58) Field of Classification Search ........... 463/6, 36–39
See application file for complete search history.

(56) References Cited

U.S. PATENT DOCUMENTS

| | | | |
|---|---|---|---|
| 5,741,185 A | | 4/1998 | Kwan et al. |
| 5,868,573 A * | | 2/1999 | Kerby et al. .............. 434/29 |
| 5,989,123 A | | 11/1999 | Tosaki et al. |
| 6,378,826 B1 * | | 4/2002 | Knaub et al. ............ 248/229.21 |
| 6,461,238 B1 | | 10/2002 | Rehkemper et al. |
| 6,544,124 B2 * | | 4/2003 | Ireland et al. .............. 463/37 |
| 2007/0078002 A1 | | 4/2007 | Evans et al. |
| 2007/0236452 A1 * | | 10/2007 | Venkatesh et al. ......... 345/158 |
| 2007/0287537 A1 | | 12/2007 | Yu et al. |
| 2008/0004114 A1 | | 1/2008 | McVicar et al. |
| 2008/0096654 A1 | | 4/2008 | Mondesir et al. |
| 2008/0125224 A1 * | | 5/2008 | Pollatsek .............. 463/36 |
| 2008/0242415 A1 * | | 10/2008 | Ahmed .............. 463/39 |
| 2008/0318672 A1 * | | 12/2008 | Ramaswamy et al. ......... 463/29 |

OTHER PUBLICATIONS

Logitech G27 Racing Wheel; retrieved online Aug. 2010 from website: http://www.logitech.com/en-us/gaming/wheels/devices/5184; 3 pages.
Team ARC modified Logitech Racing Wheel; Jun. 2009; retrieved online Aug. 2010 from website: http://www.virtualr.net/team-arc-steering-wheel-first-photos/; 4 pages.

* cited by examiner

*Primary Examiner* — Ronald Laneau
*Assistant Examiner* — Justin Myhr
(74) *Attorney, Agent, or Firm* — Michael A. Glenn; Glenn Patent Group (57) ABSTRACT

A racing car steering wheel assembly provides an input/output interface for a participant in a multimedia interactive electronic game. Two primary paddles on the underside of the wheel control throttle and braking functions, respectively. Secondary paddles or buttons may be included on either the side of the wheel for optionally controlling gear selection. Integral accelerometers are included for determining wheel rotation. Steering inputs are caused either by rotation about a fixed point to which the wheel may be affixed or by rotation in free air. A wired or wireless interface to a PC or game console provides communication with game software and optional wired or wireless communication between the user and other individuals. Switches and buttons may be included to emulate controls on real race cars and for inputting game information. A panel display and/or a decorative logo plate may be included on the wheel.

15 Claims, 7 Drawing Sheets

RACING CAR WHEEL AND CONTROLS FOR USE IN A MULTIMEDIA INTERACTIVE ENVIRONMENT

BACKGROUND OF THE INVENTION

1. Technical Field

The invention relates generally to input/output devices for interactive electronic games and, in particular, to interface devices for controlling a virtual vehicle in an interactive simulation environment.

2. Description of the Background Art

Steering wheel devices for electronic games and interactive simulation environments have evolved in recent years to emulate those that are used in real racing vehicles, including some of the latest features found in real racing vehicles. As real racing cars switched from older style manual transmissions to shiftable semi-automatic transmissions, it became common for upshifting and downshifting to be controlled by separate switching actuators located either underneath or on the front side of the basic steering wheel structure, the most common arrangement being that of shifter paddles mounted underneath the steering wheel.

Figure 1:
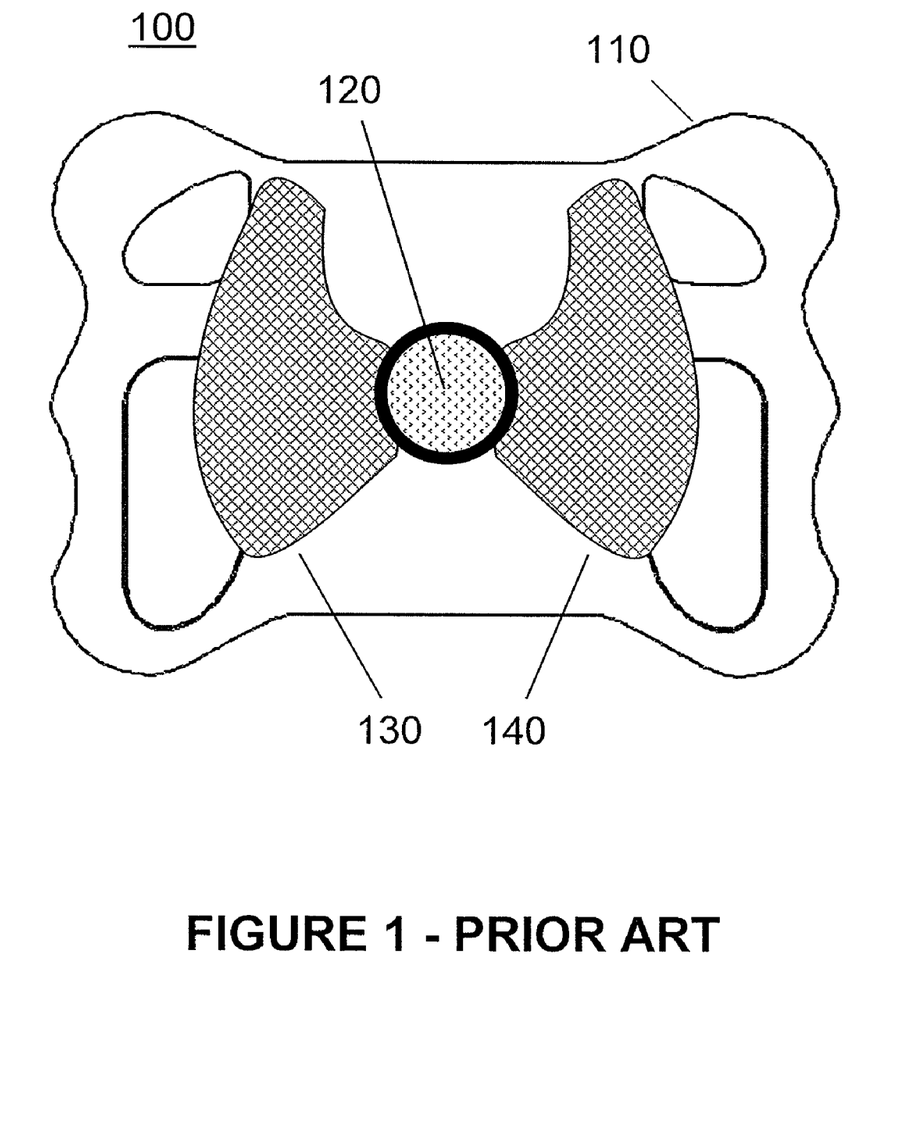
FIG. 1 shows an underside view of a prior art steering wheel for an electronic game having shifter paddles for upshifting and downshifting control.

FIG. 1 shows a prior art steering wheel assembly 100 for an electronic game as viewed from the underside, essentially looking towards the steering wheel structure 110 from the perspective of the rotational steering shaft 120 to which the wheel structure is attached. Also, attached to the underside of the wheel structure are two paddles or actuation levers 130 and 140. Typically, paddle 130 is operated by the driver's right hand to control upshifting, while paddle 140 is operated by the driver's left hand to control downshifting. Such paddles are typically connected to switches that are, in turn, connected to an electronic control system. As such, which shifting operation is controlled by which hand can be programmably reversed, if desired.

Figure 2:
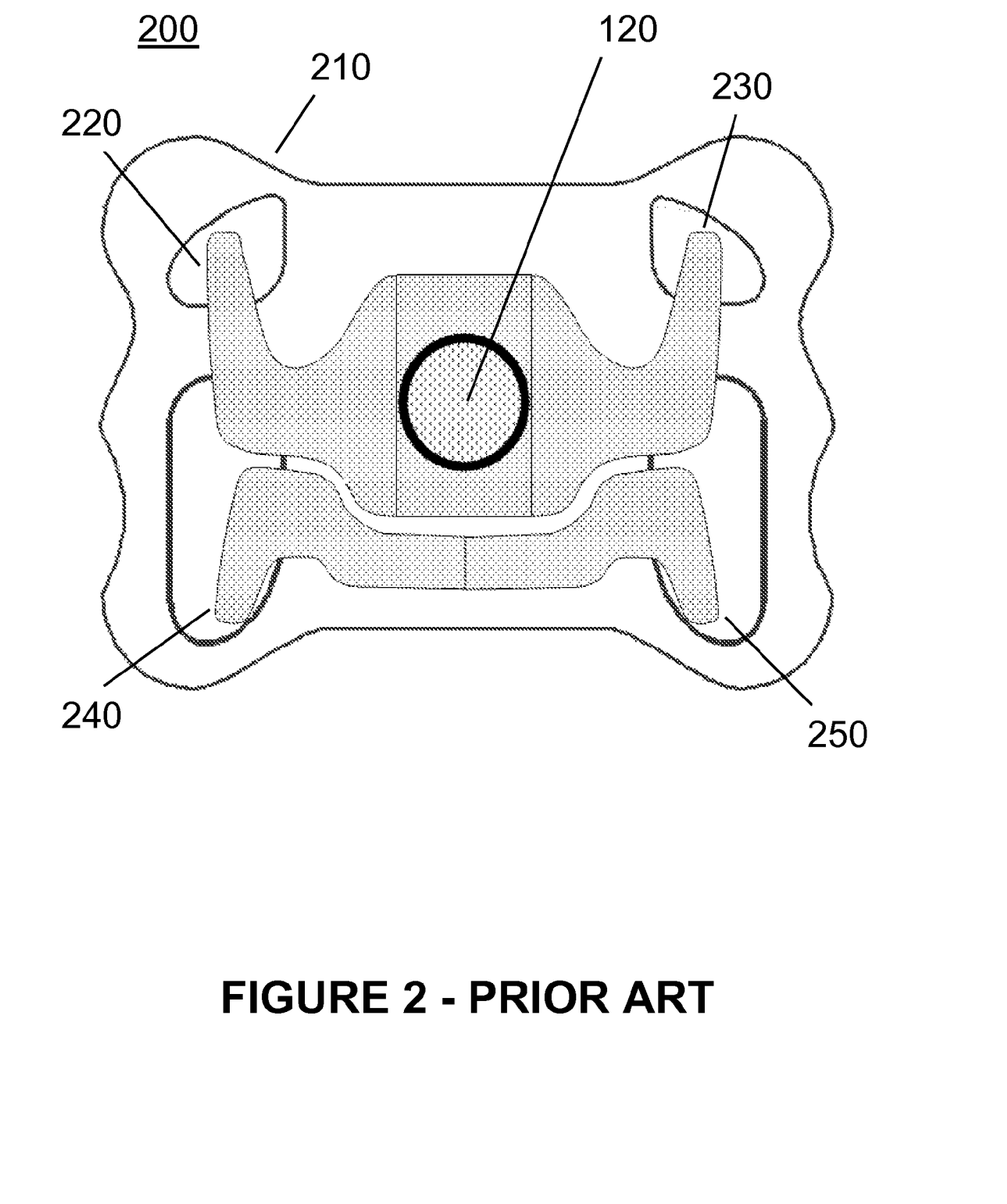
FIG. 2 shows an underside view of a prior art steering wheel for an electronic game having primary paddles for upshifting and downshifting, as well as secondary paddles for functions such as a clutch.

A more advanced prior art steering wheel for electronic games and interactive simulation environments is shown in FIG. 2. Here, steering wheel assembly 200 is again viewed from the underside from the perspective of the rotational shaft 120 to which wheel structure 210 is attached. Also attached to wheel structure 210 are primary paddles 220 and 230, as well as secondary paddles 240 and 250. Note that the primary paddles are considerably larger than the secondary paddles. For prior art steering wheel assemblies used with games and simulations, as well as in real-world racing cars, paddle 220 typically controls upshifting and paddle 230 typically controls downshifting. Secondary paddles 240 and 250 control other functions that may include operation of a clutch or the setting of control inputs, such as brake bias.

To emulate a real racing car fully, control input devices require some form of throttle and brake control in addition to steering and shifting. Because real racing cars have brake and throttle pedals that are foot-actuated, the convention in gaming applications is to offer pedal assemblies for those functions when the application involves electronic games and interactive simulation environments. Such pedal assemblies, however, add extra cost. They also require wired or wireless connections and must be located in a convenient position for the user's feet. It would be advantageous if such a pedal assembly for brake and throttle input could be eliminated while still offering the user a realistic and satisfying experience.

Existing steering wheel input devices for games and interactive simulation environments also require that the steering wheel to be attached, or otherwise affixed, to some form of rotational mounting device that emulates the steering shaft on a real vehicle. The rotational mounting device normally consists of a steering shaft protruding from a game console that must be mounted and positioned in such a way to offer the user a realistic and satisfying experience. Such a mounting location is not always convenient and the cost of the console adds to the overall cost the user must pay. It would be advantageous if a steering wheel assembly, such as assembly 200, could be used without being attached to any form of rotational mounting device. To do so would require a user holding the wheel in free space to have the ability to rotate the steering wheel assembly 200 in free space, while the system senses the degree to which it is rotated. While it is known to have computer and game input devices which sense movement in free space, such as the WII® device from the NINTENDO® company, such devices require some form of RF transmitter located in the immediate vicinity of the game input device which provides additional information used by the device to sense movement in free space. Such an RF transmitter is an additional expense and adds complexity to the overall system.

Therefore, in view of the deficiencies of the prior art, it would be advantageous to have a steering wheel assembly that can sense rotation while being rotated in free space by the user without requiring additional external components.

SUMMARY OF THE INVENTION

A racing car steering wheel assembly provides an input/output interface for a participant in a multimedia interactive electronic game. Two primary paddles on the underside of the wheel control throttle and braking functions, respectively. Secondary paddles or buttons may be included on either the side of the wheel for optionally controlling gear selection. Integral accelerometers are included for determining wheel rotation. Steering inputs are caused either by rotation about a fixed point to which the wheel may be affixed or by rotation in free air. A wired or wireless interface to a PC or game console provides communication with game software and optional wired or wireless communication between the user and other individuals. Switches and buttons may be included to emulate controls on real race cars and for inputting game information. A panel display and/or a decorative logo plate may be included on the wheel.

DETAILED DESCRIPTION OF THE INVENTION

A racing car steering wheel assembly provides an input/output interface for a participant in a multimedia interactive electronic game. Two primary paddles on the underside of the wheel control throttle and braking functions, respectively. Secondary paddles or buttons may be included on either the side of the wheel for optionally controlling gear selection. Integral accelerometers are included for determining wheel rotation. Steering inputs are caused either by rotation about a fixed point to which the wheel may be affixed or by rotation in free air. A wired or wireless interface to a PC or game console provides communication with game software and optional wired or wireless communication between the user and other individuals. Switches and buttons may be included to emulate controls on real race cars and for inputting game information. A panel display and/or a decorative logo plate may be included on the wheel.

Figure 3:
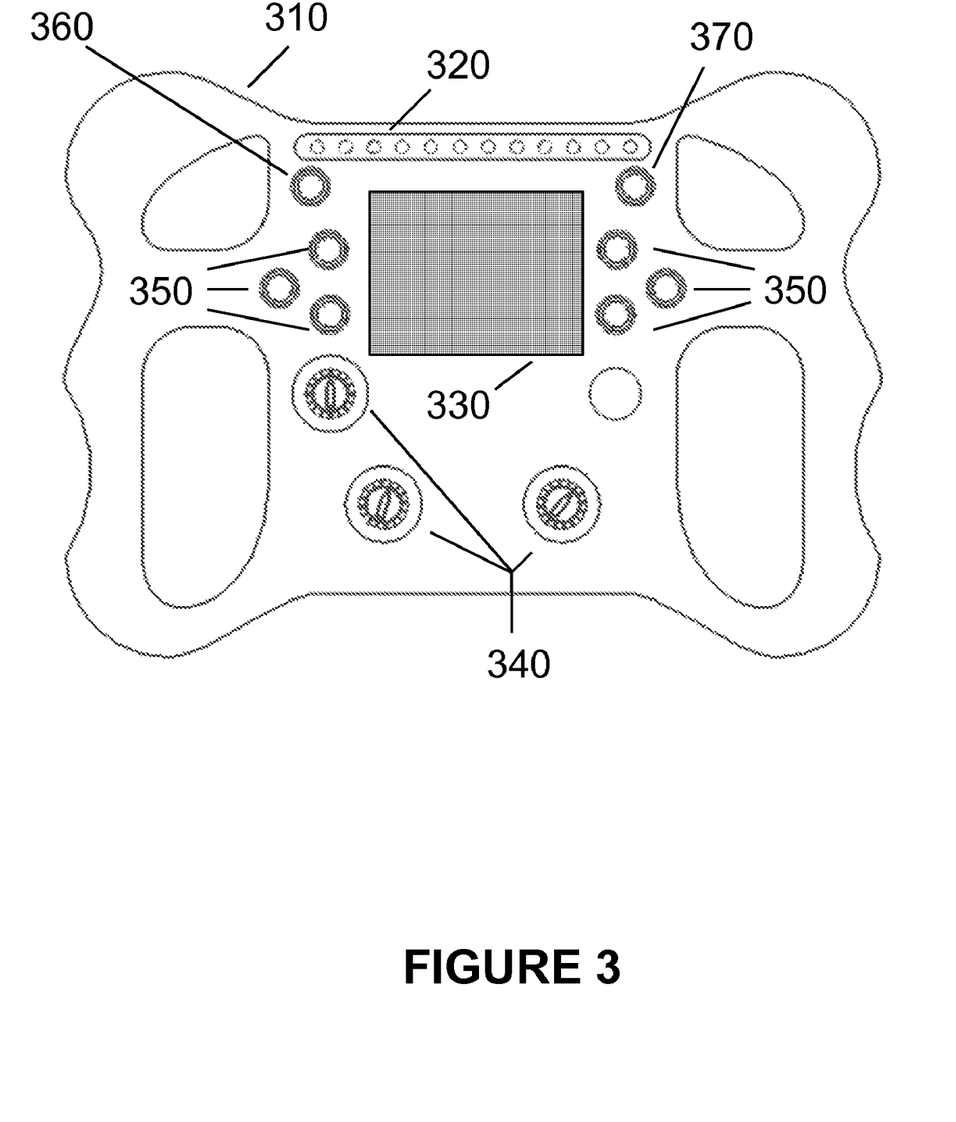
FIG. 3 shows a front side view of a steering wheel assembly according to the invention, as viewed from the front side which faces the user.

FIG. 3 shows a steering wheel assembly 300 according to the invention, as viewed from the front side facing the user. At the top of the wheel structure 310 is a row of shift indicator lights 320. Near the center of wheel structure 310 is a replaceable panel structure 330 which may comprise for example any of: a liquid crystal display (LCD) panel; a multi-digit seven segment display; and a non-electronic panel having a graphic design on the surface facing the user. The graphic design may include for example any of: the logo of a game manufacturer; a brand of vehicle; a racing team; or a custom design that has been designed by or commissioned by the user. Dial controls 340 may be implemented as multi-position switches, touch sensitive pads, potentiometers, or other user-operable control devices and may control functions for example such as: brake bias; wing position; anti-roll bar position; and engine related controls. Buttons 350 may be included for input functions as required. Buttons 360 and 370 are preferably positioned to be easily operable by the user's thumbs and, as such, may serve as upshift control 370 and downshift control 360, should it be determined that for a particular implementation shifter controls should be implemented in this manner. The paddles mounted on the underside of steering wheel 310 have been omitted from FIG. 3 for clarity.

Figure 4:
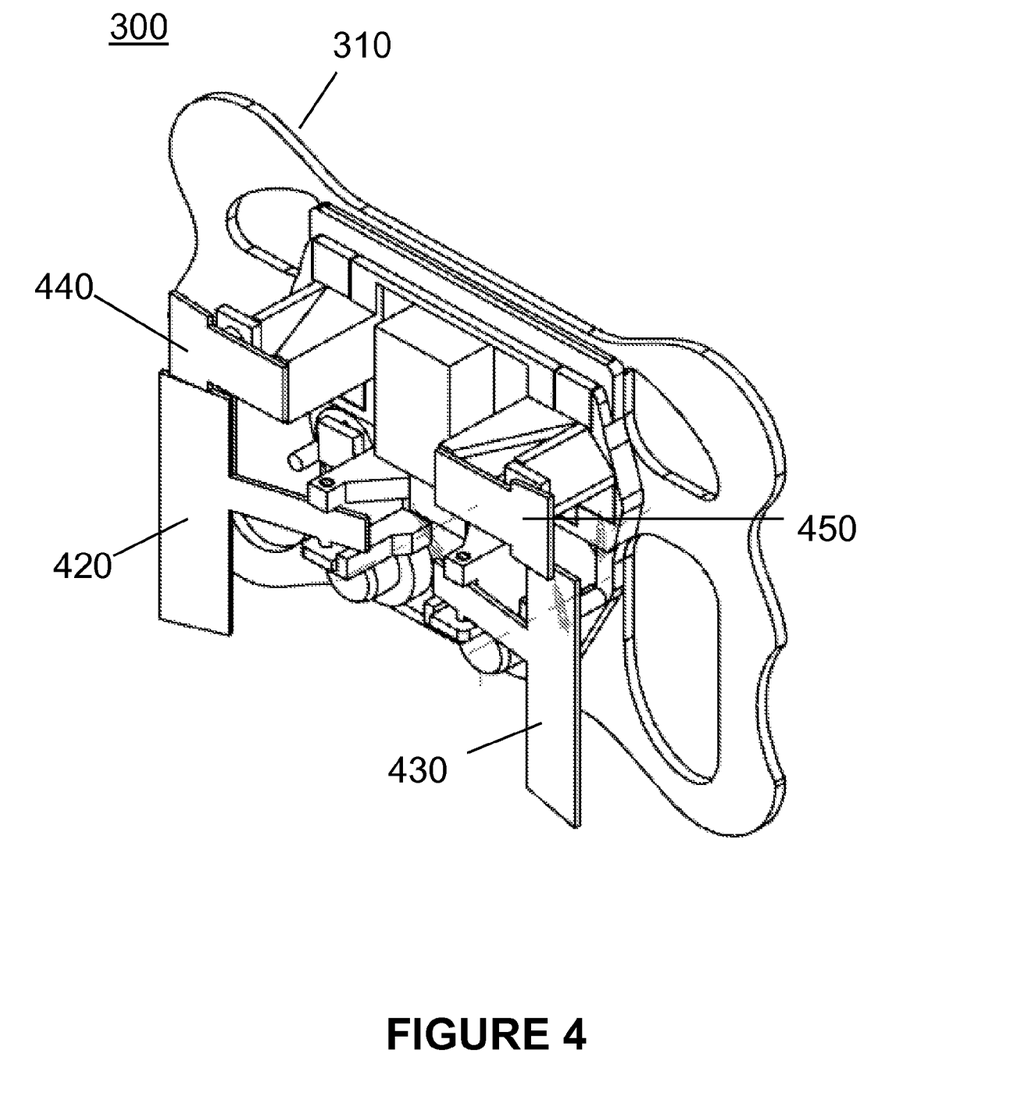
FIG. 4 shows a three-dimensional view of a steering wheel assembly according to the invention, as viewed from the underside and showing primary paddles used for throttle and brake functions, and also including secondary paddles for upshifting and downshifting functions.

FIG. 4 shows a three-dimensional view of the steering wheel assembly 300 according to the invention, as viewed from the underside of the wheel 310, i.e. the side that faces away from the user. Assembly 300 shows primary paddles used for the throttle function 420 and the brake function 430. As such, the throttle function is operated with the user's right hand. It is also possible to program the steering wheel assembly such that the choice of which user hand operates paddles 420 or 430 is programmably reversible. Also shown in FIG. 4 are secondary paddles for the upshifting function 440 and downshifting function 450. In some implementations of a steering wheel assembly, and according to the invention, paddles 440 and 450 may be replaced by shifter controls implemented as buttons 370 and 360 on the front side of wheel structure 310, as shown in FIG. 3.

Figure 5:
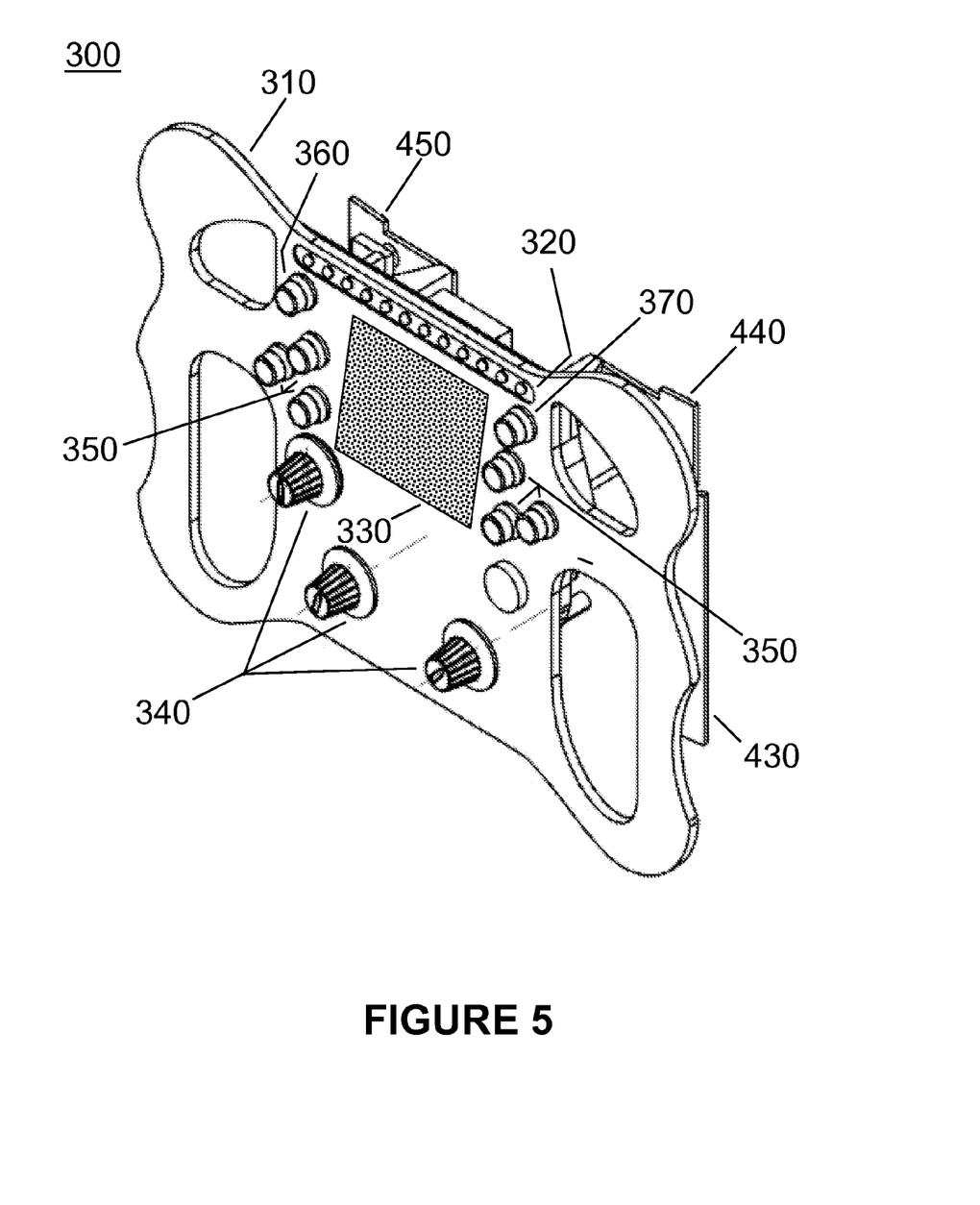
FIG. 5 shows a three-dimensional view of a steering wheel assembly according to the invention, as viewed from the front side which faces the user, and including various input and display devices.

FIG. 5 shows a three-dimensional view of the steering wheel assembly 300 according to the invention, and as viewed from the front side which faces the user. Shift lights 320 and a replaceable panel 330 are shown, as well as dial input devices 340, buttons 350, and optional shifter buttons 360 and 370. Primary paddle 430 is also shown and is typically used for controlling the throttle function, while optional secondary paddles 450 and 440 are shown for implementations where shifter controls are performed with secondary paddles. Primary paddle 440, typically used for braking according to the invention, is not visible in FIG. 5.

In addition to the physical interfaces shown in FIGS. 3 through 5, the invention may also contain interfaces allowing the user to communicate verbally with their support crew or with race officials. Communications interfaces may include, for example but without limitation, wired or wireless connection to a headset or a helmet with integrated headset, as well as a speakerphone function. A button on the front side of wheel assembly 300, such as one of buttons 350, may be used as a push-to-talk (PTT) actuation device. Speech recognition may be optionally included for verbal commands issued by the user, the software for executing speech recognition functionality residing in a PC or game console to which wheel assembly 300 is connected, or within wheel assembly 300 itself.

In one embodiment of the invention, the wheel assembly 300 includes a video interface whereby wheel structure 300 additionally comprises a camera mounted on the front side thereof to capture the user's face. Panel display 330 can display video as required or offer a split screen function whereby a portion of the wheel comprises a video image supplying information to the user. During real races where large outdoor video displays are used to show racing action at different locations around the track, and drivers acquire useful information by occasionally observing these large outdoor displays and thus learn about other competitors' situations. For an interactive game environment, this function is emulated by displaying scenes from other locations on the track either on panel display 330 or in a window on the game's primary video display, or both.

Figure 6:
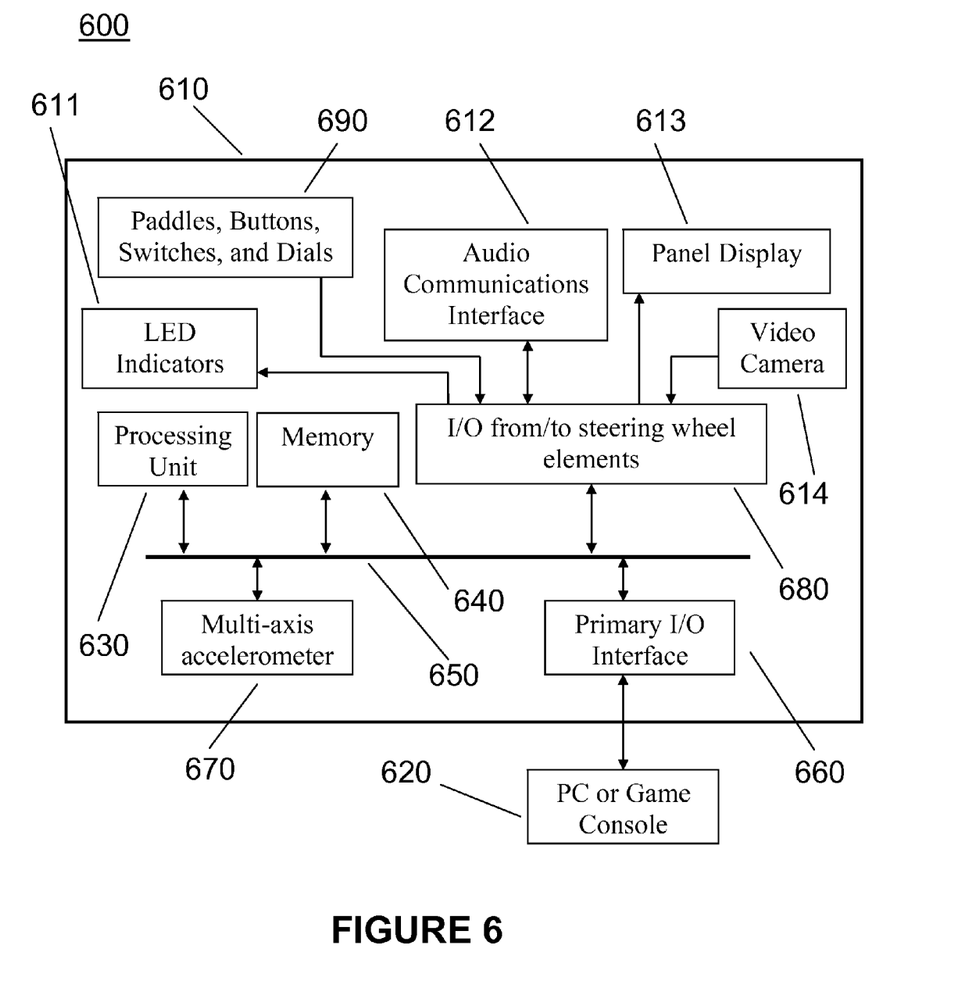
FIG. 6 shows a circuit that is operational in conjunction with the steering wheel assembly according to the invention.

FIG. 6 shows a diagram 600 of circuitry 610 comprising steering wheel assembly 300 and the primary interface to a PC or game console 620. Processing unit 630 and memory 640 communicate with bus 650, as well as with other elements of the steering wheel assembly 300, including primary I/O interface 660 which, in turn, communicates with PC or game console 620. Multi-axis accelerometer 670 provides inertial sensing for detecting the degree of rotational wheel movement in free space. Also shown is I/O communications interface 680 providing communication between the various elements comprising the steering wheel assembly 300. These elements include, but are not limited to, input devices 690 such as paddles, buttons, switches, and dials, and LED indicators 611 which include, but are not limited to, a row of shift indicator LEDs mounted at the top of assembly 300 and facing the user. Also included are audio communications interface 612, and interfaces to panel display 613 and video camera 614.

To facilitate operation of the steering wheel assembly for its primary function of rotational input, assembly 300 also incorporates at least one multi-axis inertial sensing device 670, such as an accelerometer, in the circuitry to determine movement of assembly 300 when rotated in free space by the user.

As such, the assembly 300 does not require attachment to a rotational mounting device, such as a console that may emulate the dashboard of a vehicle with a steering column protruding from it to which steering wheels normally attach. Rotational operation of steering wheel assembly 300 in free space allows the user much greater flexibility as to where, when, and how they participate in a multimedia interactive simulation environment using the instant invention. Should it be desired for any reason that steering wheel assembly 300 be mounted to some form of rotational mounting device, such as inclusion as part of a complete race car cockpit simulator structure, a mounting point may be included on the underside of assembly 300 for attachment to a rotational mounting device. In addition, the attachment mechanism between assembly 300 and a rotational mounting device, such as a steering column emulation protruding from a console, may be implemented with a quick release mechanism that is either similar to or identical to those used in real racing cars. Quick release mechanisms allow steering wheels to be removed so that the user's entry and exit into and from the cockpit is more easily performed. A quick release mechanism also allows the steering wheel assembly, during an interactive simulation, to be removed from a console and taken by the user to another location where it may be attached to a different console. This is especially useful if steering wheel cost is large and/or the wheel has been customized for the user in some manner. Customizations may include the addition of a graphic design on the front side of the wheel as mentioned earlier, and may also include additional features, such as a customized grip location on the wheel that has been molded to match the contour of the user's hands when gripping the wheel.

Figure 7:
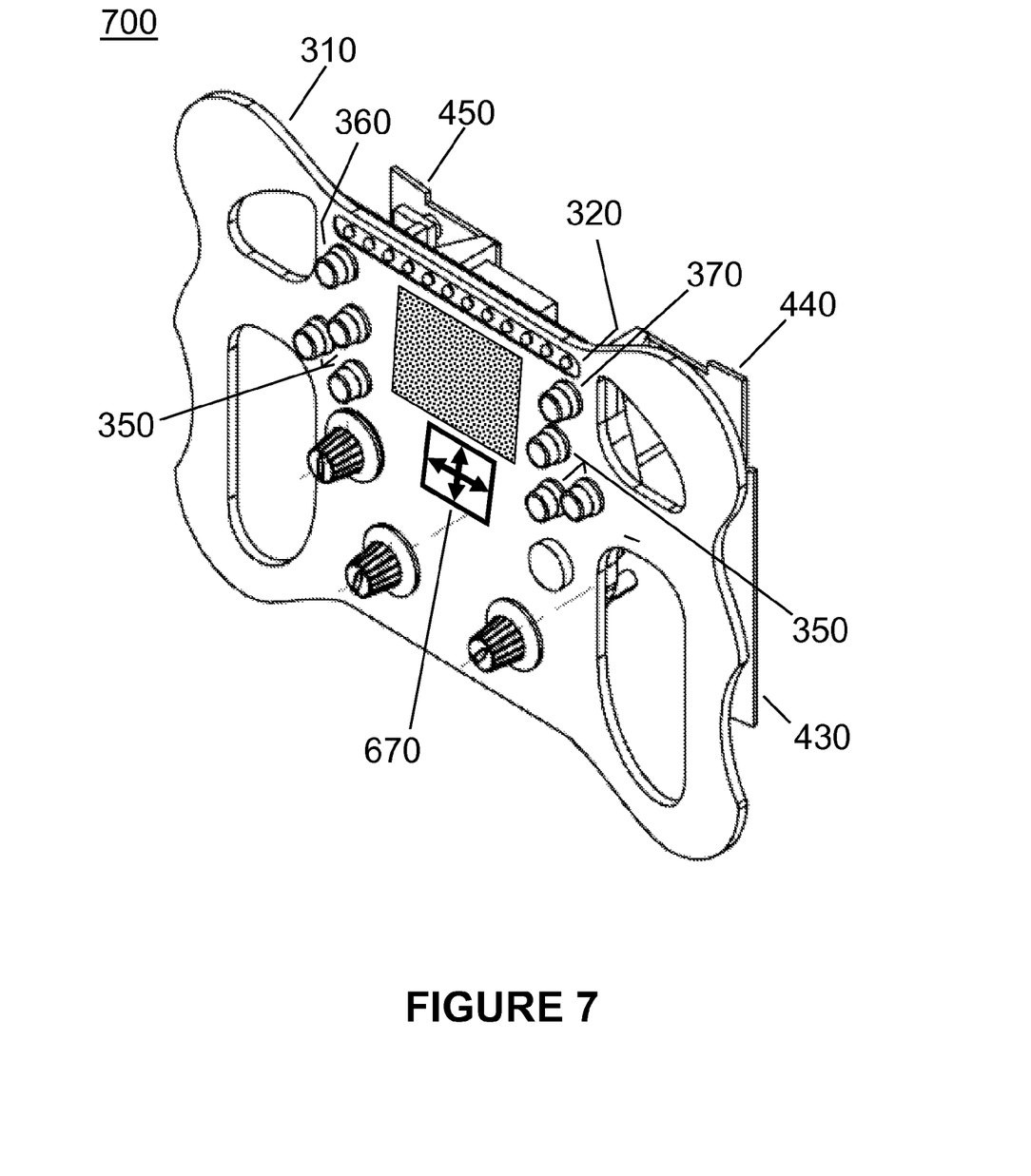
FIG. 7 shows a three-dimensional view of steering wheel assembly according to the invention.

FIG. 7 shows a three-dimensional view of steering wheel assembly 300 according to the invention. In FIG. 7, steering wheel assembly 700 is viewed from the front side that faces the user. The location and directional functionality is indicated in FIG. 7 for 2-axis accelerometer 670, which is used to compute the angular position of assembly 300. The two axes, horizontal (X) and vertical (Y), are aligned in the plane of wheel assembly 300 itself. In other words, in a preferred embodiment of the invention the axial direction is typically not measured. To determine the orientation of accelerometer 670, which is essentially its angle difference from vertical, a software algorithm finds the trigonometric ratio between the X and Y accelerations as measured by accelerometer 670. These accelerations are assumed to be from gravity, and pointing straight downward vertically. In this way an angle between 0 and 360 degrees is calculated.

The accelerometer is placed as close the center rotational axis of wheel assembly 300 as possible to eliminate any extraneous acceleration from rotation. The centrifugal effects are typically found to be minimal. Vertical acceleration does not affect the X/Y acceleration ratio. Therefore, there are only two other cases where a deviation from ideal would occur: tilting of wheel's plane from vertical, and side-to-side acceleration. One case where lateral acceleration could pose an issue is if the user is in some sort of dynamic setting such as, for example, an accelerating vehicle or a motion simulation rig. However, even in a car or airplane, pure vertical acceleration from bumps in the road or turbulence typically do not substantially affect the accelerometer's reading. One solution for these scenarios, if desired, is to attach an accelerometer to the user. According to this embodiment, the difference between the readings from the user's accelerometer and the accelerometer incorporated into wheel assembly 300 can then be taken to find the true orientation of wheel assembly 300. Under normal use, side to side acceleration is typically not be large enough in magnitude, compared to the 1 g acceleration of gravity, to affect the accuracy of accelerometer 670 substantially.

When operating within the normal range of user positions, tilting of wheel assembly 300 typically does not have an appreciable effect on the accuracy of accelerometer 670. In extreme positions, such as for example when being held flat where the plane of wheel assembly 300 is essentially parallel to the ground, the horizontal and vertical measurement axes of accelerometer 670 essentially read zero. Therefore, the software algorithms that operate and interpret the measured response from the accelerometer 670 revert the output to a neutral value if the X and Y accelerations are too low. Any angle deviations less than 20 degrees from vertical, however, are not enough to cause noticeable inaccuracies to the user and are thus ignored by the software algorithms.

It should be understood that the invention is applicable to other forms of vehicle simulation, such as motorcycles, boats, airplanes, and spacecraft. The foregoing detailed description has set forth a few of the many forms that the invention can take.

At least certain principles of the invention can be implemented as hardware, firmware, software, or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for directional control in an interactive simulation environment, comprising:
    a steering wheel;
    a first primary paddle and a second primary paddle mounted on an underside of said steering wheel, said first primary paddle configured to control a throttle function and said second primary paddle configured to control a braking function;
    at least one accelerometer configured for inertial position sensing wherein, in response rotational operation of said steering wheel, where said steering wheel is unmounted and operated in free space, said accelerometer generates signals for directional control in said interactive simulation environment, wherein said accelerometer is placed as close to a center rotational axis of said steering wheel as possible to eliminate any extraneous acceleration from rotation; and
    a processor configured to determine orientation of said accelerometer based upon an angle difference from vertical and finding a trigonometric ratio between X and Y accelerations measured by said accelerometer;
    wherein said processor is configured to calculate an angle between 0 and 360 degrees, where said accelerations assumed to be from gravity and pointing straight downward vertically;
    wherein said processor is configured to interpret a measured response from said accelerometer to revert an output to a neutral value if X and Y accelerations are below a predetermined threshold; and wherein said processor is configured to ignore any angle deviations less than about 20 degrees from vertical.

2. The apparatus of claim 1, further comprising:
a first switch for up-shift control; and
a second switch for down-shift control.

3. The apparatus of claim 2, any of said first switch and said second switch further comprising:
a secondary paddle located on said underside of said steering wheel, wherein said secondary paddle is smaller in size than each of said first primary paddle and said second primary paddle.

4. The apparatus of claim 2, any of said first switch and said second switch further comprising:
a button mounted on a front side of said steering wheel.

5. The apparatus of claim 1, further comprising:
a plurality of shift lights associated with said steering wheel.

6. The apparatus of claim 1, further comprising:
a rotary input device for control of any of brake bias, wing position, anti-roll bar position, and engine related controls.

7. The apparatus of claim 1, further comprising:
a replaceable panel located substantially in a center of said steering wheel.

8. The apparatus of claim 7, said replaceable panel comprising any of a liquid crystal display (LCD) panel, a multi-digit display, and a non-electronic panel having a graphic design thereupon.

9. The apparatus of claim 1, further comprising:
an audio communications interface associated with said steering wheel.

10. The apparatus of claim 9, said audio communications interface comprising any of:
a wired interface configured for attachment to a wired headset; and
a wireless interface configured for communication with a wireless headset.

11. The apparatus of claim 1, further comprising:
a video communications interface associated with said steering wheel.

12. The apparatus of claim 1, further comprising:
a mechanism configured to program said steering wheel, wherein the function of said first primary paddle and said second primary paddle is programmably reversible.

13. The apparatus of claim 1, further comprising:
a mounting device receiving and securing said steering wheel while allowing rotation thereof.

14. A method for directional control in an interactive simulation environment, comprising the steps of:
providing a steering wheel;
providing a first primary paddle and a second primary paddle mounted on an underside of said steering wheel;
using said first primary paddle to control a throttle function;
using said second primary paddle to control a braking function;
providing at least one accelerometer and using said accelerometer for inertial position sensing wherein, in response rotational operation of said steering wheel, where said steering wheel is unmounted and operated in free space, said accelerometer generates signals for directional control in said interactive simulation environment wherein said accelerometer is placed as close to a center rotational axis of said steering wheel as possible to eliminate any extraneous acceleration from rotation; and
providing a processor configured to determine orientation of said accelerometer based upon an angle difference from vertical and finding a trigonometric ratio between X and Y accelerations measured by said accelerometer;
wherein said processor is configured to calculate an angle between 0 and 360 degrees, where said accelerations assumed to be from gravity and pointing straight downward vertically;
wherein said processor is configured to interpret a measured response from said accelerometer to revert an output to a neutral value if X and Y accelerations are below a predetermined threshold; and
wherein said processor is configured to ignore any angle deviations less than about 20 degrees from vertical.

15. In an apparatus for directional control in an interactive simulation environment, comprising a steering wheel, and a first primary paddle and a second primary paddle mounted on an underside of said steering wheel, said first primary paddle configured to control a throttle function and said second primary paddle configured to control a braking function, a computer readable medium having stored thereon program instructions that, when executed by a processor, cause said apparatus to perform the steps of:
in response to rotation of said steering wheel, where said steering wheel is unmounted and operated in free space, receiving as an input inertial position sensing of at least one accelerometer, wherein said accelerometer is placed as close to a center rotational axis of said steering wheel as possible to eliminate any extraneous acceleration from rotation;
generating from said signals a representation of said rotation of said steering wheel with a processor configured to determine orientation of said accelerometer based upon an angle difference from vertical and finding a trigonometric ratio between X and Y accelerations measured by said accelerometer;
wherein said processor is configured to calculate an angle between 0 and 360 degrees, where said accelerations assumed to be from gravity and pointing straight downward vertically;
wherein said processor is configured to interpret a measured response from said accelerometer to revert an output to a neutral value if X and Y accelerations are below a predetermined threshold; and
wherein said processor is configured to ignore any angle deviations less than about 20 degrees from vertical; and
using said representation of said rotation for directional control in said interactive simulation environment.

* * * * *